March 25, 1924.  1,488,001

C. H. CLARE

CHUCK FOR HOLDING TOOLS AND BARS

Filed Nov. 14, 1922   3 Sheets-Sheet 1

INVENTOR:
Charles H. Clare
BY Wm Wallace White
ATTY.

March 25, 1924.
C. H. CLARE
1,488,001
CHUCK FOR HOLDING TOOLS AND BARS
Filed Nov. 14, 1922    3 Sheets-Sheet 2
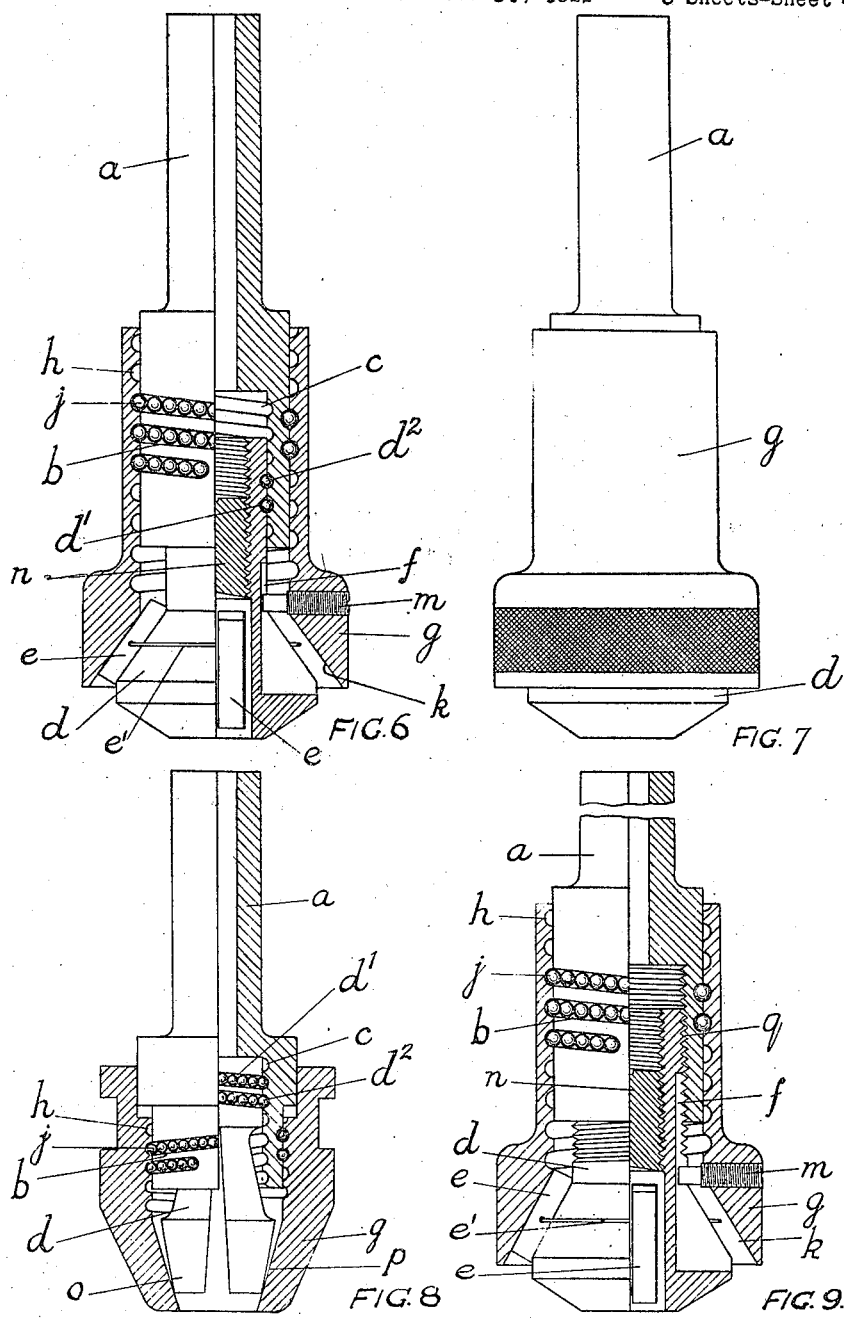
INVENTOR:
Charles H. Clare
BY Wm Wallace White
ATT'Y.

March 25, 1924.

C. H. CLARE

CHUCK FOR HOLDING TOOLS AND BARS

Filed Nov. 14, 1922   3 Sheets-Sheet 3

1,488,001

INVENTOR:
Charles H. Clare
BY Wm Wallace White
ATT'Y.

Patented Mar. 25, 1924.

1,488,001

UNITED STATES PATENT OFFICE.

CHARLES HENRY CLARE, OF SALFORD, ENGLAND.

CHUCK FOR HOLDING TOOLS AND BARS.

Application filed November 14, 1922. Serial No. 600,826.

*To all whom it may concern:*

Be it known that I, CHARLES HENRY CLARE, of 20 Kent Street, Lower Broughton, Salford, in the county of Lancaster, England, a subject of the King of Great Britain and Ireland, have invented new and useful Improvements in Chucks for Holding Tools and Bars, of which the following is a specification.

This invention relates to chucks for holding tools and bars.

According to this invention a chuck for holding drills, taps, reamers and like tools and bars comprises a shank adapted to receive interiorly thereof a sleeve for carrying a tool, and exteriorly thereof a nose, said nose encircling the sleeve, means being provided for permitting and effecting, simultaneously, longitudinal movement between the shank and the sleeve, between the shank and the nose and between the sleeve and nose on rotation of the one relatively to the other whereby the nose is adapted to engage and disengage the sleeve. The longitudinal motion may be effected by helical screws which may comprise one or more helically disposed ball races adapted to effect the forward or backward travel of the member or members on which they are disposed in the manner of a screw thread.

Referring to the drawings filed herewith:

Fig. 1 is a sectional elevation of one form of chuck made in accordance with this invention.

Fig. 2 being an outside elevation of same.

Fig. 6 is a sectional elevation of a modified form of chuck made in accordance with this invention.

Fig. 7 is an outside elevation.

Figs. 8, 9 and 10 are views showing further modified forms.

In Figs. 1 to 5, the shank $a$ of the chuck is provided exteriorly with a helical groove $b$ in the direction of a right hand thread and interiorly with a left hand screw thread $c$, said shank being adapted to receive, interiorly thereof, a sleeve $d$ having an exterior left hand thread engaging the interior left hand thread of the tubular shank, said sleeve having a tapered end provided with movable jaws $e$ adapted to hold a tool and grooves $f$ extending for a distance upwards from the lower end of the sleeve. $g$ is a nose having an interior helical groove $h$ in the direction of a right hand thread and is fitted over the shank and encircles the sleeve, balls $j$ being disposed in the helical grooves $b$ and $h$ in the shank and the nose thus forming a helical ball race in the direction of a right hand thread whereby longitudinal movement of both is permitted relatively to the rotation of the one or the other. The nose is formed with an interiorly tapered face $k$ adapted, on longitudinal movement between the nose and the sleeve, to engage and disengage the movable jaws in the tapered end of the sleeve, and is also provided with threaded holes to receive grub screws $m$ which engage the grooves $f$ in the sleeve, whereby the sleeve moves instantly the nose or shank is rotated thereby effecting instantaneous longitudinal movement between the sleeve and the nose resulting in a more rapid grip on, and release of, the tool. A threaded plug $d^3$ is provided in the top of the exteriorly threaded shank to act as a stop for the sleeve $d$.

In operation, when a tool is placed in the chuck with its shank entering the sleeve $d$ and the chuck is rotated as usual, on the drill coming in contact with the work to be drilled the statical friction between the drill and the work is sufficient to restrain the drill against rotation, thereby likewise restraining the sleeve $d$ and nose $g$ against rotation which instantly causes longitudinal movement between the shank and the sleeve and the nose, the sleeve moving downwards and the nose upwards, resulting in the jaws $e$ being closed tightly upon the tool by their coming in contact with the interiorly tapered face of the nose $g$ whereupon the tool, the sleeve and the nose rotate along with the shank. The greater the resistance offered by the work to the tool in cutting, drilling or boring the more intense is the grip.

To relax the grip on the tool so that it may be withdrawn, the nose $g$ is rotated in the forward direction at a quicker speed, for example, by a sharp glancing stroke of the hand, thus causing the nose $g$ to move downwards and the sleeve $d$ upwards thereby disengaging the jaws $e$, $e$ from the interiorly tapered face $k$ of the nose whereby the tool is released.

Figure 11:
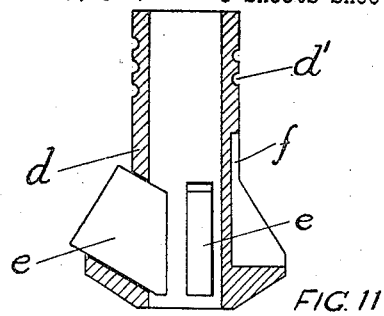
Figs. 11 to 14 are views showing further modified forms of sleeves.
Figure 14:
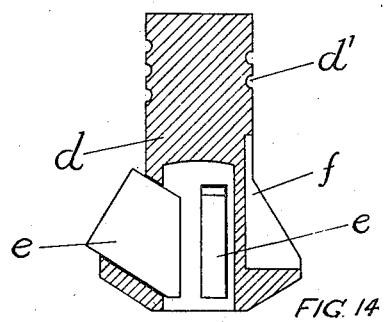
Figure 12:
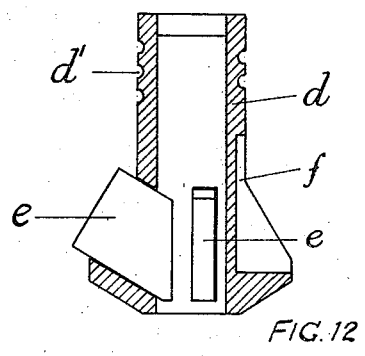
Figure 13:
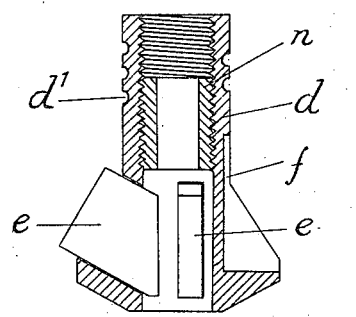
Figure 15:
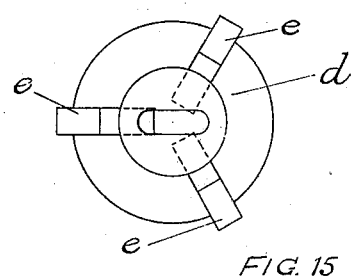
Figs. 15 and 16 are plan views of Figs. 12 and 13 respectively.
Figure 16:
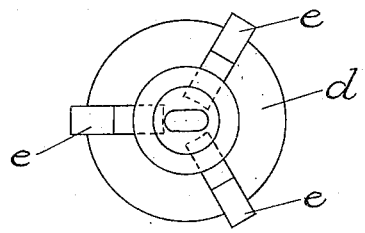

In Fig. 6, $a$ is the shank of a chuck and provided with an exterior helical groove $b$ in the direction of a left hand thread and an interior helical groove $c$ in the direction of a right hand thread. A sleeve $d$ for holding a tool and having an exterior helical groove $d'$ in the direction of a right hand thread engages the interior of the shank $a$, balls $d^2$ being disposed in the groove $c$ and $d'$ to form a helical ball race thereby permitting longitudinal movement between the sleeve and the shank on rotation of the one or the other. The sleeve $d$ has a conical outer end carrying movable jaws $e, e$ provided with a spring actuating member $e'$. The sleeve also has a groove $f$ extending upwards for a portion of its length. $g$ is a nose having an interior helical groove $h$ in the direction of a left hand thread, balls $j$ being disposed in the grooves $b$ and $h$ forming a helical ball race and thereby permitting longitudinal movement between the shank and the nose on rotation of the one or the other. The nose $g$ is also provided with an internal conical face $k$ and with a screwed hole to receive a grub screw $m$ which engages the groove $f$ in the sleeve $d$. The upper end of the sleeve $d$ may be threaded interiorly to receive a threaded plug $n$ to act as a stop for the tool to be held, or it may be solid as shown in Fig. 14 or it may be formed with a plain hole throughout its length as shown in Fig. 11. Further a slot may be provided in the threaded plug $n$ as shown in Figs. 13 and 16 or in the sleeve itself as shown in Figs. 12 and 15 for engaging flats sometimes formed on the end of the tool.

In operation, the nose $g$ moves longitudinally downwards and the sleeve longitudinally upwards, the conical face $k$ of the nose thereby engaging the movable jaws $e$ in the sleeve and effecting a grip on the tool.

Figures 1, 2:
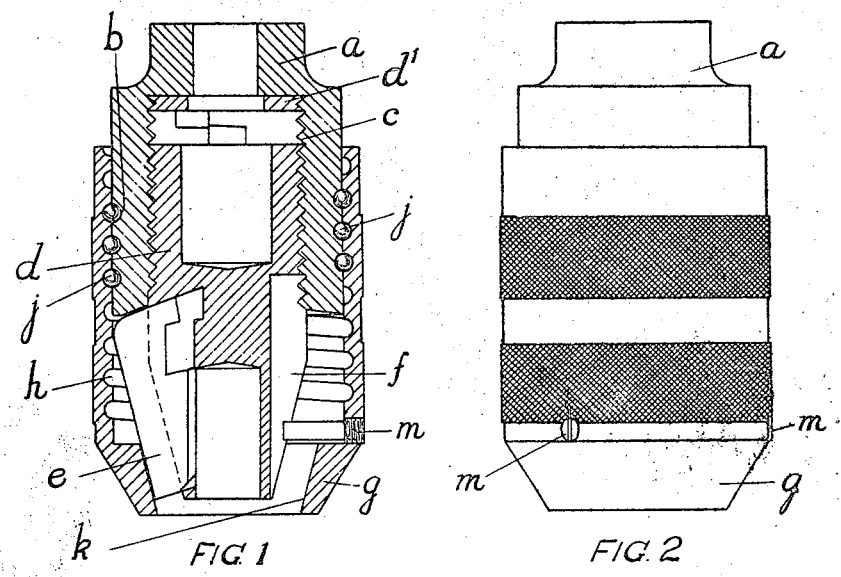
Figures 3, 4:
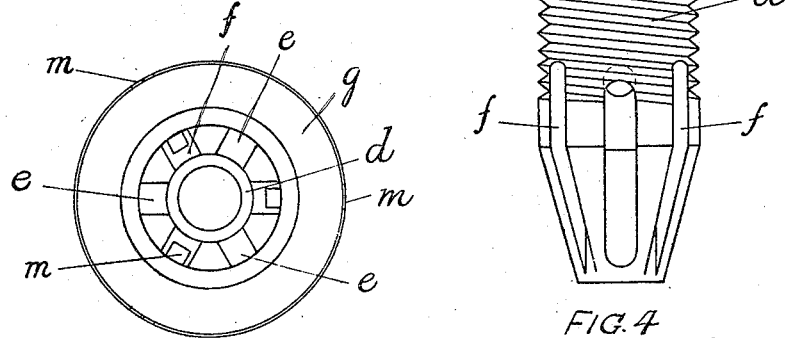
Fig. 3 is a bottom plan view of Fig. 1.
Figs. 4 and 5 are elevation and sectional plan of the sleeve.
Figure 5:
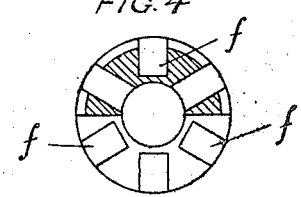
Figure 10:
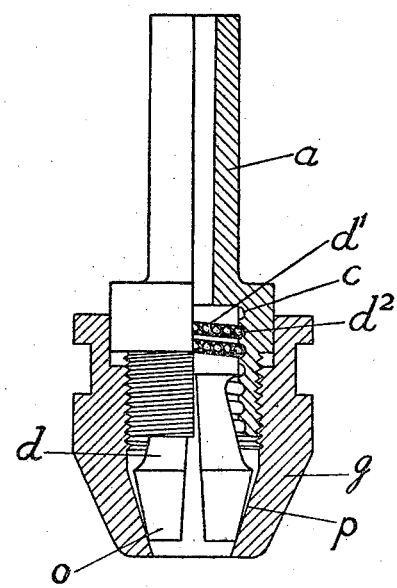

In Fig. 8, the helical ball race formed by the grooves $b$ and $h$ in the shank $a$ and nose $g$ respectively with balls disposed therein, are in the direction of a right hand thread, and the helical ball race formed by the grooves $d'$ and $c$ in the sleeve and the shank respectively with balls $d^2$ disposed therein are in the direction of a left hand thread. Further, the sleeve $d$ is split at intervals for a portion of its length, as shown in Figs. 8 and 10, and has a tapered end $o$. The nose $g$ also has a correspondingly tapered end $p$. The grub screw $m$ shown in Fig. 6 is dispensed with.

In operation, the nose $g$ moves upwards longitudinally and the sleeve downwards, the inclined face of the tapered end $p$ thereby engaging the tapered end $o$ of the split sleeve and causing it to close onto the tool and grip it.

In Fig. 9, the shank $a$ and sleeve $d$ are each provided with a right hand screw thread $q$ for effecting a longitudinal movement between said shank and sleeve instead of the helical ball race formed by the right hand helical grooves $b$ and $h$ shown in Fig. 6, the action in operation being precisely the same as in Fig. 6.

In Fig. 10, the shank $a$ and nose $g$ are each provided with a right hand screw thread for effecting longitudinal movement between said shank and nose instead of the right hand helical grooves $b$ and $h$ shown in Fig. 8, the action in operation being precisely the same as in Fig. 8.

It will be understood that my improved chuck can be used either as an independent device or form part of the spindle of a machine and in this connection it is very suitable for turret lathes.

What I claim and desire to secure by Letters Patent is:

1. A rapidly operating chuck comprising a tubular shank or spindle, a sleeve or jaw holder having a helical engagement with the interior of the tubular shank, a nose or exterior sleeve having a helical engagement with the exterior of the tubular shank opposite in pitch from that of the sleeve or jaw holder, and means for causing the jaw holder or sleeve and the exterior sleeve or nose to rotate together while permitting relative longitudinal movement of one with respect to the other.

2. A rapidly operating chuck comprising a tubular shank or spindle, a sleeve or jaw holder having a helical engagement with the interior of the tubular shank, a nose or exterior sleeve having a helical engagement with the exterior of the tubular shank opposite in pitch from that of the sleeve or jaw holder, and means for causing the jaw holder or sleeve and the exterior sleeve or nose to rotate together while permitting relative longitudinal movement of one with respect to the other, said means comprising grub screws carried in the nose and projecting into and engaging grooves in the sleeve.

In testimony whereof I have signed my name to this specification.

CHARLES HENRY CLARE.